April 11, 1967 Z. TRNKA 3,313,164

DEVICE FOR SOLVING DIRECT AND INVERSE FOURIER INTEGRAL AND FOR HARMONIC ANALYSIS

Filed Feb. 17, 1965 3 Sheets-Sheet 1

INVENTOR.

Zdeněk Trnka

BY Richard Low Ag't

INVENTOR.
Zdeněk Trnka
BY
Richard Low
Agt

April 11, 1967 Z. TRNKA 3,313,164

DEVICE FOR SOLVING DIRECT AND INVERSE FOURIER INTEGRAL AND FOR HARMONIC ANALYSIS

Filed Feb. 17, 1965 3 Sheets-Sheet 3

INVENTOR.
Zdeněk Trnka
BY

United States Patent Office 3,313,164

Patented Apr. 11, 1967

3,313,164

DEVICE FOR SOLVING DIRECT AND INVERSE FOURIER INTEGRAL AND FOR HARMONIC ANALYSIS

Zdeněk Trnka, Prague, Czechoslovakia, assignor to Ceskoslovenska akademie ved, Prague, Czechoslovakia Filed Feb. 17, 1965, Ser. No. 433,307
Claims priority, application Czechoslovakia, Feb. 27, 1964, 1,116/64
5 Claims. (Cl. 74—198)

The invention relates to a device for solving a direct and inverse Fourier integral and for harmonic analysis, wherein the amplitude and the phase shift of a frequency spectrum, or the real and imaginary part of a frequency spectrum are determined from the ordinates of a given curve at $\rho$ points spaced from each other at a distance $T/\rho$, for any continuously varying frequency, or, on the contrary, from a continuous frequency spectrum defined at $\rho$ points, there is determined the value of a function at arbitrarily distributed points.

In current technical practice, more particularly when solving problems related with the analysis and synthesis of linear automatic control circuits, it is sometimes required to carry out quickly and readily a Fourier transformation of a given, experimentally determined function, or to find the time original of a given frequency function. The direct or inverse Fourier integral may be solved by means of standard harmonic analysers, but the direct or inverse transformation is obtained at discrete points, that is only for harmonics whose order is an integer. It is often necessary to find a function for which the amplitude of the continuous spectrum is a maximum, or, in the case of an inverse transformation, to find again the time where the response is a maximum. The analyser must therefore be constructed so as to give a continuous spectrum of the analysed function to permit to determine in the direct analysis the frequency at which the spectrum has its maximum, and in the case of an inverse transformation to determine the time where the response is a maximum.

Figures 1A, 1B:
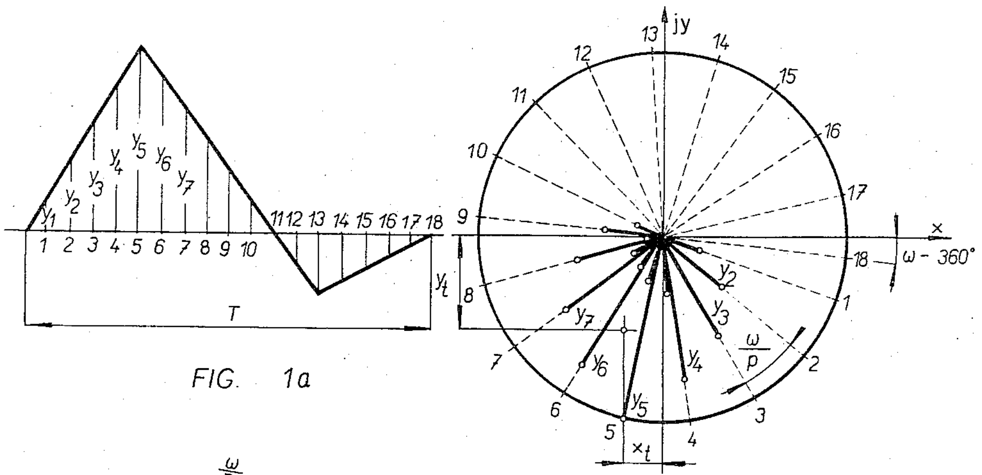
Figure 2:
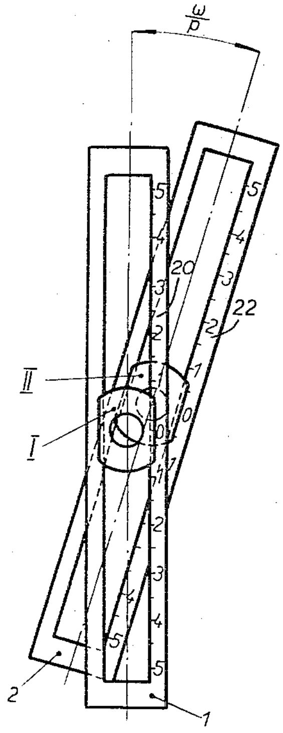
Figure 2A:
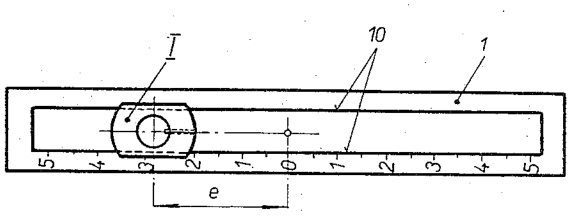
Figure 3:
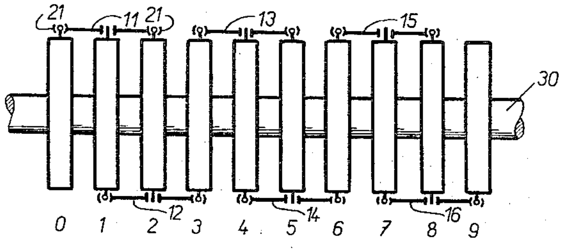
Figure 4:
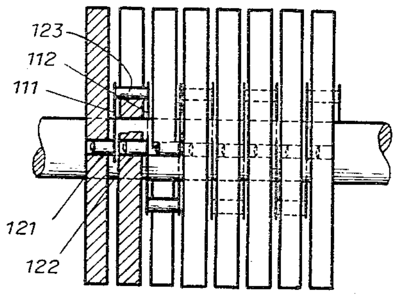
Figure 4A:
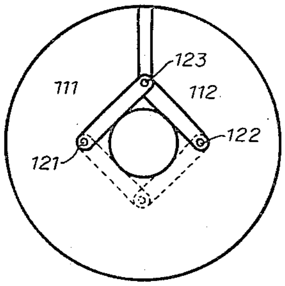
Figure 5:
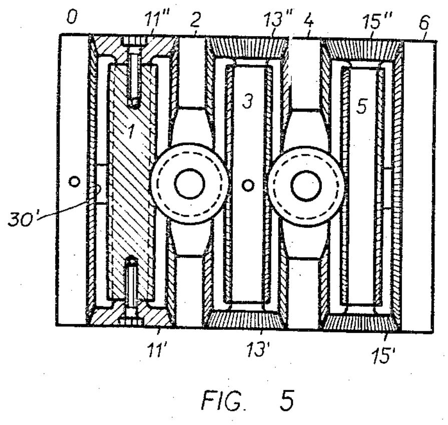
Figure 5A:
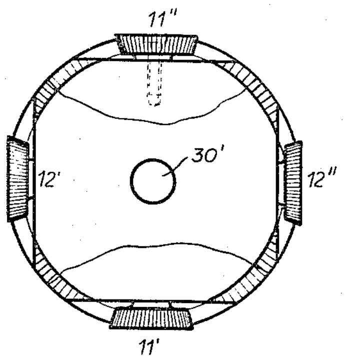
Figure 6:
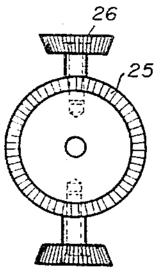
Figure 6A:
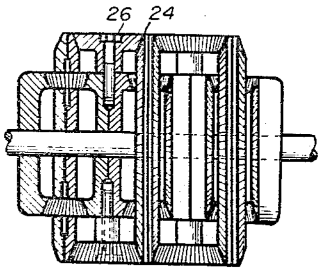
Figure 6B:
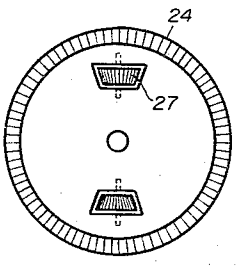
Figure 7:
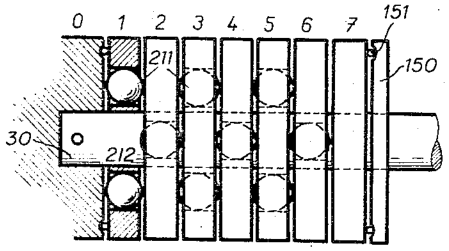
Figure 7A:
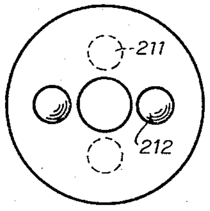
Figure 8:
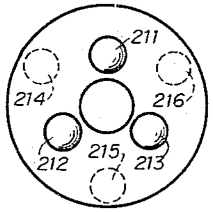
Figure 8A:
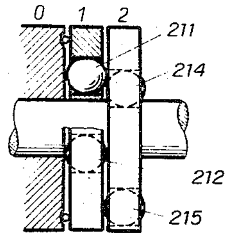

The invention and the principles underlying it will be better understood by reference to the accompanying drawing in which:

FIG. 1*a* illustrates a function to be subjected to Fourier transformation in Cartesian coordinates;

FIG. 1*b* shows the function of FIG. 1*a* in polar coordinates;

FIG. 2 shows an analyzing device of the prior art for Fourier analysis of the function of FIGS. 1*a*, 1*b* in plan view;

FIG. 2*a* shows a portion of the device of FIG. 2;

FIG. 3 partly illustrates a first embodiment of the invention in an elevational view;

FIG. 4 shows the hub portion of another embodiment in side-elevational, partly sectional view;

FIG. 4*a* shows elements of the device of FIG. 4 in front elevation;

FIG. 5 is a side elevational, partly sectional view of the hub portion of yet another embodiment;

FIG. 5*a* shows the device of FIG. 5 in front elevation and partly in section;

FIGS. 6 and 6*b* respectively illustrate elements of the device of FIG. 6*a* in front elevation;

FIG. 6*a* shows yet another analyzer of the invention in a view corresponding to that of FIG. 5;

FIG. 7 shows the hub portion of an additional apparatus of the invention in side-elevation and partly in section;

FIG. 7*a* illustrates a detail of the apparatus of FIG. 7 in front elevation; and FIGS. 8 and 8*a* show a modification of the apparatus of FIG. 7 in views corresponding to those of FIGS. 7*a* and 7 respectively.

Referring initially to FIGS. 1*a* to 2*a*, there is seen a known analyser of the mentioned type. The device operates in the following manner: The analysed function $f(t)$, FIG. 1*a*, which meets the condition for a Fourier transformation that the area above the time axis is finite, is represented in FIG. 1*b* in a polar diagram as a system of $\rho$ equal points having a weight $g$ on radii vectors of a length $y_k$ enclosing an angle $\omega/\rho$ between each other, where $\omega$ is the angle between the zero and last ordinate, $y_k$ are the ordinates of the analysed curve at equidistant points, T is the time from which the function begins to be zero in the direction toward higher times.

The position of the centre of gravity of this system in coordinates $x$ and $jy$, FIG. 1*b*, is given by the ratio $$Z_t = x_t + jy_t = \sum_{k=t}^{k=p} y_k\left(\cos k\frac{\omega}{\rho} - j \sin k\frac{\omega}{\rho}\right) = \int_0^\infty f(t)e^{-jwt}.dt$$

which is proportional to the $x$-component and the $y$-component of the spectrum A $(j\omega)$ for the frequency $\omega$, where $\omega$ is the angle between the zero and first ordinate. In order to find the magitude of these components it is therefore necessary to adjust the radii vectors of the various mass points in accordance with the ordinates of the analysed curve or course (they are adjusted in a position where all of them are parallel), and the various radii vectors should be rotated with respect to each other through angles $\omega/\rho$. It is then sufficient to determine the position of the centre of gravity of this system with respect to the axis 0. This is accomplished either by balancing, or from the time of swing using horizontal rulers as a support, or by means of a special balancing device which does not form a part of this invention and will therefore not be referred to in more detail.

Since adjustment of the distances between the mass points, and adjustment of the angles between their radii vectors would take up much time, these points are represented by equal links 1, 2, etc. which are arranged movably on hubs 1, 11, etc., see FIG. 2. These links may have any suitable plane shape, but it is important that they all be equal. They are provided with a guide 10 and can thus be radilly moved along guide surfaces of the respective hubs. If the link is just in a position in which its centre of gravity $c$ lies in the axis of the hub, its static moment with respect to this axis is zero. But if the centre of the hub lies outside the mentioned position at a distance $e$, its moment is $$m = g \cdot e$$

$g$ being the weight of the link, and $e$ the distance to which the centre of gravity has been removed from the axis. The static moment of each link can therefore be adjusted by moving the same with respect to the hub. The links are therefore provided with scales 20, 22, etc., and a scale reading line is provided on the hub.

In existing devices of this type, the various links and hubs were rotated with respect to each other by means of a shaft provided with a helical groove into which are fitted cylindrical journals of the hub. But such an arrangement permitted only to ascertain harmonics of an integer order, in accordance with the lead of the helical groove of the shaft. This is very often insufficient because the most interesting points of the spectrum, that is the extremes, cannot be ascertained directly in this manner.

It is therefore a general object of the invention to provide between the hubs carrying the links a mechanical linkage which permits to change the order of the investigated harmonic in a continuous manner.

It should be obvious to those expert in the art that the solution of this problem adapts the device not only for carrying out a Fourier transformation, but also for use as a harmonic analyser $f(t) = 2\pi\nu$, where $\nu$ is the order of the harmonic for the selected cycle T, that is if the last ordinate is rotated through an integer number of revolutions.

To solve this problem, the invention provides a mechanical linkage between the hubs which divides the total rotation of the last hub uniformly between the various individual hubs.

This division or distribution of the total rotation of the last hub between the individual hubs may be accomplished in accordance with the invention in several different manners all of which meet the above mentioned fundamental feature of the invention.

Referring now more particularly to FIG. 3, it should be understood that this embodiment of the invention assumes that the angle of rotation of two adjacent hubs need not be greater than 45°. The division of the total rotation mentioned above is achieved by linking each group of three adjacent hubs by means of a two-armed lever 11, 12, 13, 14, 15, 16, as illustrated on the figure. The lever is pivoted in the central hub of the group and its ends are connected by ball-and-socket joints 21 to the extreme hubs of the group. The hubs are freely movable along axle 30 to allow a change in their axial distances during rotation. To understand how this gear works, let us assume that the central one of the three hubs which are linked by a two-armed lever is deviated through an angle $$\beta=\frac{\alpha+\gamma}{2}$$

where $\alpha$ and $\gamma$ are the angles of the extreme or end hubs, and $\beta$ is the angle of the central hub. If now hub 0 is stopped and hub 1 is rotated through an angle $\beta$, hub 2 is rotated through an angle $2\beta$. By means of the lever 12, the rotation is transferred upon the following hub 3 by an angle $3\beta$. The left end of the lever 12 is rotated through an angle $\beta$, the centre of this lever 12 is rotated through an angle $2\beta$, and the hub 3 is therefore rotated through an angle $3\beta$, etc.

It should now be understood from the above specification that if there are $\rho$ hubs, of which the first one which is marked, as in FIG. 3, 0, it will be referred to as "zero hub" and will be kept stationary, the angle of rotation $\omega$ of the last hub of this system will be divided with respect to the position of the zero hub into $\rho$ equal parts. Therefore, adjacent hubs, and of course also adjacent links, define an angle $\omega/\rho$, as required by the function of the device.

The same effect and result may be obtained by the arrangement indicated in FIG. 4. The axial distances between the various hubs are kept constant by a system of hingedly linked arms 111, 112 better seen in FIG. 4*a*, which is a schematic side elevation of a portion of the device shown in FIG. 4. The two arms 111, 112 carry end journals or studs 121, 122, and are linked by a central stud 123. The studs 121, 122 engage the extreme or end hubs of a group of three axially juxtaposed hubs, and the stud 23 fits into a radial slot in the central hub. The arms 111, 112 link the three adjacent hubs as explained above with reference to FIG. 3.

In the embodiment illustrated in FIG. 5, the total rotation is divided between the various hubs by means of bevel gears if the angle of rotation need not be larger than 90°. This applies, if $\rho=36$, that is with 36 links for a given cycle, to the ninth harmonic.

This arrangement uses bevel gears cut into the front faces of the individual hubs 0, 1, 2, etc. each of which carries two planet wheels 11′–11″ mounted in diametrical opposition. The planet wheels are freely rotatable about the axis and they are mounted on milled faces of the doubly toothed hub in such a manner as to mesh with the next hub which is toothed in a similar manner. If there are $\rho$ ordinates, the number of doubly toothed hubs with two planet wheels is $\rho-1$, the front hub 0 and the rear hub 6 have only one toothed rim each. The front hub 0 is stationarily keyed on the shaft 30′, while the other hubs, including the rear hub 6, are easily rotatable on the shaft. If now the rear hub is rotated through an angle $\omega$, the front hub 0 remains at rest with regard to the shaft, and all other hubs are linked together.

Uniform division of the angle is obvious from the following analysis: consider three adjacent hubs, for example 1, 2, 3 and rotate hub 1 through an angle $\beta$. Because hub 0 is stationary, the rolling planet wheels cause the hub 2 to be rotated through an angle $2\beta$, the hub 3 through an angle $3\beta$, the hub 5 through an angle $5\beta$, and so forth. It is obvious that between any two adjacent hubs, the condition of mutual or relative rotation through an angle $\beta$ is always met.

In FIG. 5, the planet wheels of successive hubs are offset by an angle of 90°. The planet wheels are positioned as close as possible to each other (made possible by incomplete toothing) to obtain the largest possible angle between adjacent ordinates. If the last hub is rotated, the planet wheels move away from each other until they reach the extreme possible position. The drawing shows that this angle is greater than 90°.

The above described bevel gear arrangement may be modified so as to permit an angle of any size between two adjacent hubs. In this arrangement alternating hubs carry bevel gear rims 24, 25 of different diameters, as indicated in FIGS. 6, 6*a*, and 6*b*. A pair of planet wheels 26 are mounted on a shaft which radially projects beyond the rim 25, and engage the large toothed rim 24. The pair of large rims 24 carries two inwardly offset planet wheels 27, and these planet wheels mesh with the smaller bevel gear rim 25. This arrangement operates in the same manner as described above.

In the embodiment of the invention illustrated in FIG. 7 each hub is freely rotatable on a common axle or shaft 30 and it is provided with two openings in diametrical opposition. Balls 211, 212 pass without play through these openings. The axial thickness of the hub is somewhat smaller than the diameter of the ball. Balls of the various hubs are illustrated in the left part of FIG. 7 in a position in which their radii vectors include an angle of 90°.

The starting position of the hubs is illustrated in FIG. 7. In this position all links are parallel. All hubs are pressed against each other by the last hub which is acted upon by a resilient member 150 through a thrust bearing 151. If the rear hub is rotated through an angle $\omega$, the balls roll over the various hubs like the gears in the preceding modification so that the angle $\omega$ of the rear hub is uniformly divided between the various hubs like in the preceding case.

The described modification may also be adapted to permit any rotation between the various hubs, as indicated in FIG. 8. The first hub is provided with three balls 211, 212, 213 rolling over a stationary hub. The second hub is provided with openings with balls 214, 215, 216 arranged radially outside the balls 211, 212, 213 so that they do not interfere with movement of the first hub. The complete analyser may be assembled from the described hubs with different spacing diameters of the openings, like in the modification according to FIG. 7.

It is evident that the mechanical linkages described divide the angle of rotation of the last hub into $\rho$ equal parts. If the ordinates of the analysed curve are adjusted on the movable links (in the position in which the links are parallel), the position of the centre of gravity is determined, as mentioned above, with respect to the axis of rotation either by balancing, or from the period of oscillation when the axis 0 is supported on horizontal rulers. From the ordinates of the centre of gravity which have been determined in this manner it is then possible to determine for example the magnitude and phase of the various components of the freqeuncy spectrum of the examined course, even if the spectrum is a continuous one. This is one of the main advantages of the invention.

What I claim is:

1. A device for solving a direct and inverse Fourier integral and for harmonic analysis, wherein the amplitude and phase shift of the frequency spectrum, or the real and imaginary part of the frequency spectrum are determined from the ordinates of the given curve at $\rho$ points removed from each other through a distance $T/\rho$ for any continuously varying frequency, or wherein the value of a function is determined at arbitrarily distributed points from a continuous frequency spectrum defined at $\rho$ points, comprising:

(a) a plurality of hub members mounted in axial sequence for rotation about a common axis;

(b) a plurality of substantially identical link members respectively mounted on said plurality of hub members for radial movement relative to the associated hub member; and (c) linkage means operatively interposed between said hub members and responsive to relative angular displacement of the axially first and last hub members for rotating the hub members seqeuntially interposed between said first and last members through respective angles which are integral multiples of an integral fraction of the angle of said angular displacement.

2. A device as claimed in claim 1, wherein said linkage means include bevel teeth on the faces of each hub member facing an adjacent hub member, and a rotary planet wheel meshing with the teeth of each adjacent hub member.

3. In a device as claimed in claim 1:

each hub member being provided with two openings, said linkage means including a ball in each of the said openings having a larger diameter than the thickness of the hub member and touching the adjacent hub members, and resilient means axially pressing said hub members axially against each other.

4. A device for solving a direct and inverse Fourier integral and for harmonic analysis, comprising:

a shaft, a plurality of rotary hubs mounted on the said shaft in axially movable relationship, a two-armed lever for any three adjacent hubs of the said plurality of hubs, each of the said two-armed levers provided with a central journal or stud, and with an end journal or stud on each of its two ends, the central journals being in rotary engagement with the respective central hub of the three hubs, and the two end journal fitting each into one of the two end hubs, respectively, of the three adjacent hubs.

5. A device as claimed in claim 4, wherein the two end journals are of the ball type.

References Cited by the Examiner

UNITED STATES PATENTS

| | | | |
|---|---|---|---|
| 2,851,905 | 9/1958 | Clark | 74—801 |
| 2,861,475 | 11/1958 | Bolie | 74—675 |

OTHER REFERENCES

German application K 13,554, February 1956.

DAVID J. WILLIAMOWSKY, *Primary Examiner.*

L. H. GERIN, *Assistant Examiner.*